US007715425B2

(12) United States Patent
Yonge, III et al.

(10) Patent No.: US 7,715,425 B2
(45) Date of Patent: May 11, 2010

(54) CHANNEL ADAPTATION SYNCHRONIZED TO PERIODICALLY VARYING CHANNEL

(75) Inventors: Lawrence W. Yonge, III, Ocala, FL (US); Srinivas Katar, Ocala, FL (US); Stanley J. Kostoff, II, Ocala, FL (US); William E. Earnshaw, Ocala, FL (US); Bart W. Blanchard, Fort McCoy, FL (US); Hassan Kaywan Afkhamie, Ocala, FL (US); Harper Brent Mashburn, Gainesville, FL (US)

(73) Assignee: Atheros Communications, Inc., Santa Clara, CA (US)

( * ) Notice: Subject to any disclaimer, the term of this patent is extended or adjusted under 35 U.S.C. 154(b) by 1153 days.

(21) Appl. No.: 10/787,544

(22) Filed: Feb. 26, 2004

(65) Prior Publication Data

US 2005/0190785 A1     Sep. 1, 2005

(51) Int. Cl.
*H04J 3/16* (2006.01)
(52) U.S. Cl. ............... 370/437; 370/465; 370/503; 340/538
(58) Field of Classification Search ............. 370/516, 370/465, 437, 447, 462, 463, 503; 340/538
See application file for complete search history.

(56) References Cited

U.S. PATENT DOCUMENTS

| | | | |
|---|---|---|---|
| 3,806,885 A | 4/1974 | Moore | |
| 4,032,884 A | 6/1977 | Gutleber | |
| 4,569,044 A | 2/1986 | Tao et al. | |
| 4,581,734 A | 4/1986 | Olson et al. | |
| 4,630,261 A | 12/1986 | Irvin | |
| 4,677,612 A | 6/1987 | Olson et al. | |
| 4,682,324 A | 7/1987 | Ulug | |
| 4,720,850 A | 1/1988 | Oberlander et al. | |
| 4,726,018 A | 2/1988 | Bux et al. | |
| 4,792,947 A | 12/1988 | Takiyasu et al. | |
| 4,819,229 A | 4/1989 | Pritty et al. | |
| 4,881,241 A | 11/1989 | Pommier et al. | |
| 4,943,959 A | 7/1990 | Arnold | |
| 5,001,472 A | 3/1991 | Fischer et al. | |
| 5,003,539 A | 3/1991 | Takemoto et al. | |

(Continued)

FOREIGN PATENT DOCUMENTS

DE          3413144          10/1985

(Continued)

OTHER PUBLICATIONS

X-10 Coomunications Protocol and Power Line Interface , Jun. 2003 by SEcurity & Automation for the Professional.*

(Continued)

*Primary Examiner*—Jason E Mattis
*Assistant Examiner*—Dady Chery
(74) *Attorney, Agent, or Firm*—Fish & Richardson P.C.

(57) ABSTRACT

A method of operating in a network (e.g., a power line communication network) in which a plurality of stations communicate over a shared medium (e.g., an AC power line) having a periodically varying channel. The method includes determining a plurality of channel adaptations (e.g., tone maps) for communication between a pair of stations, and assigning a different one of the plurality of channel adaptations to each of a plurality of phase regions of the periodically varying channel.

52 Claims, 12 Drawing Sheets

Example of Noise Variation with AC Line Cycle Phase

U.S. PATENT DOCUMENTS

| | | |
|---|---|---|
| 5,046,069 A | 9/1991 | Calvignac et al. |
| 5,081,678 A | 1/1992 | Kaufman et al. |
| 5,105,423 A | 4/1992 | Tanaka et al. |
| 5,121,396 A | 6/1992 | Irvin et al. |
| 5,140,584 A | 8/1992 | Suzuki |
| 5,157,659 A | 10/1992 | Schenkel |
| 5,197,061 A | 3/1993 | Halbert-Lassalle et al. |
| 5,214,646 A | 5/1993 | Yacoby |
| 5,228,025 A | 7/1993 | Le Floch et al. |
| 5,231,634 A | 7/1993 | Giles et al. |
| 5,274,629 A | 12/1993 | Helard et al. |
| 5,280,480 A | 1/1994 | Pitt et al. |
| 5,307,376 A | 4/1994 | Castelain et al. |
| 5,339,313 A | 8/1994 | Ben-Michael et al. |
| 5,343,473 A | 8/1994 | Cidon et al. |
| 5,384,777 A | 1/1995 | Ahmadi et al. |
| 5,416,801 A | 5/1995 | Chouly et al. |
| 5,426,646 A | 6/1995 | Slack |
| RE35,001 E | 7/1995 | Grow |
| 5,432,848 A | 7/1995 | Butter et al. |
| 5,436,905 A | 7/1995 | Li et al. |
| 5,448,565 A | 9/1995 | Chang et al. |
| 5,452,288 A | 9/1995 | Rahuel et al. |
| 5,452,322 A | 9/1995 | Lauer |
| 5,473,602 A | 12/1995 | McKenna et al. |
| 5,481,535 A | 1/1996 | Hershey |
| 5,483,529 A | 1/1996 | Baggen et al. |
| 5,488,632 A | 1/1996 | Mason et al. |
| 5,504,747 A | 4/1996 | Sweazey |
| 5,515,379 A | 5/1996 | Crisler et al. |
| 5,524,027 A | 6/1996 | Huisken |
| 5,537,414 A | 7/1996 | Takiyasu et al. |
| 5,541,922 A | 7/1996 | Pyhalammi |
| 5,548,649 A | 8/1996 | Jacobson |
| 5,555,268 A | 9/1996 | Fattouche et al. |
| 5,563,883 A | 10/1996 | Cheng |
| 5,563,897 A | 10/1996 | Pyndiah et al. |
| 5,568,476 A | 10/1996 | Sherer et al. |
| 5,610,908 A | 3/1997 | Shelswell et al. |
| 5,612,975 A | 3/1997 | Becker et al. |
| 5,615,212 A | 3/1997 | Ruszczyk et al. |
| 5,619,651 A | 4/1997 | Young |
| 5,623,512 A | 4/1997 | Sasaki |
| 5,629,948 A | 5/1997 | Hagiwara et al. |
| 5,636,230 A | 6/1997 | Marturano et al. |
| 5,644,576 A | 7/1997 | Bauchot et al. |
| 5,651,009 A | 7/1997 | Perreault et al. |
| 5,694,389 A | 12/1997 | Seki et al. |
| 5,706,348 A | 1/1998 | Gray et al. |
| 5,717,689 A | 2/1998 | Ayanoglu |
| 5,732,113 A | 3/1998 | Schmidl et al. |
| 5,737,330 A | 4/1998 | Fulthorp et al. |
| 5,745,769 A | 4/1998 | Choi |
| 5,757,766 A | 5/1998 | Sugita |
| 5,757,770 A | 5/1998 | Lagoutte et al. |
| 5,764,931 A | 6/1998 | Schmahl et al. |
| 5,771,235 A | 6/1998 | Tang et al. |
| 5,787,071 A | 7/1998 | Basso et al. |
| 5,790,541 A | 8/1998 | Patrick et al. |
| 5,793,307 A | 8/1998 | Perrault et al. |
| 5,799,033 A | 8/1998 | Baggen |
| 5,812,599 A | 9/1998 | Van Kerckhove |
| 5,818,821 A | 10/1998 | Schurig |
| 5,818,826 A | 10/1998 | Gfeller et al. |
| 5,825,807 A | 10/1998 | Kumar |
| 5,828,293 A * | 10/1998 | Rickard ............ 375/257 |
| 5,828,677 A | 10/1998 | Sayeed et al. |
| 5,841,778 A | 11/1998 | Shaffer et al. |
| 5,841,873 A | 11/1998 | Lockhart et al. |
| 5,884,040 A | 3/1999 | Chung |
| 5,886,993 A | 3/1999 | Ruszczyk et al. |
| 5,892,769 A | 4/1999 | Lee |
| 5,896,561 A | 4/1999 | Schrader et al. |
| 5,903,614 A | 5/1999 | Suzuki et al. |
| 5,914,932 A | 6/1999 | Suzuki et al. |
| 5,914,959 A | 6/1999 | Marchetto et al. |
| 5,940,399 A | 8/1999 | Weizman |
| 5,940,438 A | 8/1999 | Poon et al. |
| 5,948,060 A | 9/1999 | Gregg et al. |
| 5,956,338 A | 9/1999 | Ghaibeh |
| 5,966,412 A | 10/1999 | Ramaswamy |
| 5,970,062 A | 10/1999 | Bauchot |
| 5,987,011 A | 11/1999 | Toh |
| 6,005,894 A | 12/1999 | Kumar |
| 6,006,017 A | 12/1999 | Joshi et al. |
| 6,041,063 A | 3/2000 | Povlsen et al. |
| 6,041,358 A | 3/2000 | Huang et al. |
| 6,044,154 A | 3/2000 | Kelly |
| 6,044,482 A | 3/2000 | Wong |
| 6,052,377 A | 4/2000 | Ohmi et al. |
| 6,076,115 A | 6/2000 | Sambamurthy et al. |
| 6,092,214 A | 7/2000 | Quoc et al. |
| 6,097,703 A | 8/2000 | Larsen et al. |
| 6,098,179 A | 8/2000 | Harter, Jr. |
| 6,108,713 A | 8/2000 | Sambamurthy et al. |
| 6,115,429 A | 9/2000 | Huang |
| 6,125,150 A | 9/2000 | Wesel et al. |
| 6,130,887 A | 10/2000 | Dutta |
| 6,130,894 A | 10/2000 | Ojard et al. |
| 6,151,296 A | 11/2000 | Vijayan et al. |
| 6,169,744 B1 | 1/2001 | Grabelsky et al. |
| 6,182,147 B1 | 1/2001 | Farinacci |
| 6,188,717 B1 | 2/2001 | Kaiser et al. |
| 6,192,397 B1 | 2/2001 | Thompson |
| 6,202,082 B1 | 3/2001 | Tomizawa et al. |
| 6,215,792 B1 | 4/2001 | Abi-Nassif |
| 6,216,244 B1 | 4/2001 | Myers et al. |
| 6,222,851 B1 | 4/2001 | Petry |
| 6,243,386 B1 | 6/2001 | Chan et al. |
| 6,243,449 B1 | 6/2001 | Margulis et al. |
| 6,246,770 B1 | 6/2001 | Stratton et al. |
| 6,252,849 B1 | 6/2001 | Rom et al. |
| 6,259,696 B1 | 7/2001 | Yazaki et al. |
| 6,263,445 B1 | 7/2001 | Blumenau |
| 6,278,685 B1 | 8/2001 | Yonge, III et al. |
| 6,278,716 B1 | 8/2001 | Rubenstein et al. |
| 6,279,716 B1 | 8/2001 | Kayatani et al. |
| 6,289,000 B1 | 9/2001 | Yonge, III |
| 6,295,296 B1 | 9/2001 | Tappan |
| 6,334,185 B1 | 12/2001 | Hansson et al. |
| 6,343,083 B1 | 1/2002 | Mendelson et al. |
| 6,363,052 B1 | 3/2002 | Hosein |
| 6,370,156 B2 | 4/2002 | Spruyt et al. |
| 6,385,672 B1 | 5/2002 | Wang et al. |
| 6,393,051 B1 | 5/2002 | Koizumi et al. |
| 6,397,368 B1 | 5/2002 | Yonge, III et al. |
| 6,421,725 B1 | 7/2002 | Vermilyea et al. |
| 6,430,192 B1 | 8/2002 | Creedon et al. |
| 6,430,661 B1 | 8/2002 | Larson et al. |
| 6,434,153 B1 | 8/2002 | Yazaki et al. |
| 6,442,129 B1 | 8/2002 | Yonge, III et al. |
| 6,456,649 B1 | 9/2002 | Isaksson et al. |
| 6,466,580 B1 | 10/2002 | Leung |
| 6,469,992 B1 | 10/2002 | Schieder |
| 6,473,435 B1 | 10/2002 | Zhou et al. |
| 6,480,489 B1 | 11/2002 | Muller et al. |
| 6,487,212 B1 | 11/2002 | Erimli et al. |
| 6,501,760 B1 | 12/2002 | Ohba et al. |
| 6,519,263 B1 | 2/2003 | Huth |
| 6,526,451 B2 | 2/2003 | Kasper |
| 6,538,985 B1 | 3/2003 | Petry et al. |
| 6,553,534 B2 | 4/2003 | Yonge, III et al. |
| 6,567,914 B1 | 5/2003 | Just et al. |
| 6,654,410 B2 | 11/2003 | Tzannes |

| | | | |
|---|---|---|---|
| 6,667,991 | B1 | 12/2003 | Tzannes |
| 6,671,284 | B1 | 12/2003 | Yonge, III et al. |
| 6,747,976 | B1 | 6/2004 | Bensaou et al. |
| 6,778,507 | B1 | 8/2004 | Jalali |
| 6,985,534 | B1 * | 1/2006 | Meister ............... 375/260 |
| 7,298,691 | B1 | 11/2007 | Yonge, III et al. |
| 7,369,579 | B2 * | 5/2008 | Logvinov et al. ........ 370/509 |
| 2001/0012319 | A1 | 8/2001 | Foley |
| 2001/0043576 | A1 | 11/2001 | Terry |
| 2001/0048692 | A1 | 12/2001 | Karner |
| 2002/0012320 | A1 | 1/2002 | Ogier et al. |
| 2002/0042836 | A1 | 4/2002 | Mallory |
| 2002/0048368 | A1 | 4/2002 | Gardner |
| 2002/0065047 | A1 | 5/2002 | Moose |
| 2002/0191533 | A1 | 12/2002 | Chini et al. |
| 2003/0006883 | A1 | 1/2003 | Kim et al. |
| 2003/0079169 | A1 | 4/2003 | Ho et al. |
| 2003/0174664 | A1 | 9/2003 | Benveniste |
| 2003/0217182 | A1 | 11/2003 | Liu et al. |
| 2004/0001499 | A1 | 1/2004 | Patella et al. |
| 2004/0070912 | A1 | 4/2004 | Kopp |
| 2005/0114904 | A1 | 5/2005 | Monk et al. |

FOREIGN PATENT DOCUMENTS

| | | |
|---|---|---|
| WO | 98/40970 | 9/1998 |
| WO | 98/57439 | 12/1998 |
| WO | 98/57440 | 12/1998 |
| WO | WO00/72495 | 11/2000 |
| WO | 01/41341 | 6/2001 |
| WO | 02/41598 | 5/2002 |
| WO | 02/51089 | 6/2002 |

OTHER PUBLICATIONS

Dichmann G. et al., "Digital Signal Processing for Multi-Carrier Data Transmission on Phase-Controlled Power Lines with Nonlinearities," 1995 IEEE Int. Symp. On Circuits and Systems (ISCAS), Seattle, Apr. 30-May 3, 1995, Int. Syrnp. On Circuits and Systems (ISCAS), New York, IEEE, US, vol. 2, Apr. 30, 1995, pp. 889-892.
Kamerman, A; Aben, G; Net throughput with IEEE 802.11 wireless LANs; Wireless Communications and Networking Conference, 2000. WCNC 2000 IEEE, vol. 2, Sep. 23-28, 2000; pp. 747-752.
Dube, P.; Altman, E.; Queueing analysis of early message discard policy; Communications, 2002. ICC 2002. IEEE International Conference, vol. 4, Iss., 2002, pp. 2426-2430.
U.S. Appl. No. 09/632,303.
Sun et al., Public-key ID-based Cryptosystem, 1991, IEEE, pp. 142-144.
Bruschi, Danilo, Secure Multicast in Wireless Networks of Mobile Hosts: Protocols and Issues, 2002, Mobile Networks and Applications, pp. 503-511.
IBM, Combined use of collision resolution and collision avoidance MAC protocols, Oct. 1, 1994, IBM Technical Disclosure Bulletin, vol. 37, pp. 299-302 (NN9410299).
ISO/IEC 8802-3: 2002 International Standard (ANSI/IEEE Std 802.3) Carrier sense multiple access with collision detection (CSMA/CD) access method and physical layer specifications.
ISO/IEC 8802-11: 1999 International Standard (ANSI/IEEE Std 802.11) Wireless LAN Medium Access Control (MAC) and Physical Layer (PHY) specifications.
Shared Wireless Access Protocol (Cordless Access) Specification, SWAP-CA Revision 1.21, Jan. 27, 1999, by the HomeRF™ Technical Committee.
Interface Specification for HomePNA™ 2.0—10M8 Technology, Dec. 1, 1999.
Interface Specification for HomePNA™ 2.0—10M8 Technology—Link Layer Protocols, Dec. 1, 1999.
Bux, "Token-Ring Local-Area Networks and Their Performance," Procs. Of the IEEE, vol. 77, No. 2, Feb. 1989.
Applied Cryptography, Second Edition: protocols, algorithms, and source code in C, Bruce Schneier, 1996.
PKCS #5 v. 20: Password-Based Cryptography Standard, RSA Laboratories, Mar. 25, 1999.
HomePlug Powerline Alliance, HomePlug 1.0.1 Specification, Dec. 1, 2001.
Lee et al., "HomePlug 1.0 powerline communication LANs—protocol description and performance results", Int. J. Commun. Syst., vol. 16 (2003).
Carrier sense multiple access with collision detection (CSMA/CD) access method and physical layer specifications, ISO/IEC 8802-3: 1996 International Standard (ANSI/IEEE Std 802.3).
Bertsekas et al., Data Networks, Prentice Hall, Englewood Cliffs, NJ, Section 2.4.3 Selective Repeat ARQ (1992).
HiPerformance Radio Local Area Network (HiperLAN) Type I: Functional Specification, European Standard (Telecommunication Series) No. 300652 V. 1.2.1 Jul. 1998.
An Architecture for Differentiated Services, IETF RFC 2475, Dec. 1998.
Goalic et al., "Real-Time Turbo-Decoding of Product Codes on a Digital Signal Processor," IEEE, pp. 624-628 (1997).
Benedetto et al., "A Soft-Input Soft-Output Maximum A Posteriori (MAP) Module to Decode Parallel and Serial Concatenated Codes," TDA Progress Report 42-127, pp. 1-20 (Nov. 1996).
Peterson et al., "Error-Correcting Codes," The MIT Press (1972).
Pyndiah, "Near-Optimum Decoding of Product Codes: Block Turbo Codes," IEEE Transactions on Communications, vol. 46, No. 8, pp. 1003-1010 (Aug. 1998).
Pyndiah, "Near Optimum Decoding of Product Codes," IEEE, pp. 339-343 (1994).
Pyndiah, "Performance of Block Turbo Coded 16-QAM and 64-QAM Modulations," IEEE, pp. 1039-1043 (1995).
Ehrsam et al., "A cryptographic key management scheme for implementing the Data Encryption Standard," IBM Syst J, vol. 17, No. 2 (1978).
Niwa et al., A Spread-Spectrum System with Dual Processing Gains Designed for Cyclic Noise in Power Line Communications, IEICE Trans. Fundamentals, vol. E80-A, No. 12, pp. 2526-2533, Dec. 1997.
Dodds et al., Power Line Data Communication Using Timed Transmission in Proceedings of IEEE Canadian Conference of Electrical and Computer Engineering, Sep. 1994, vol. 1, pp. 280-283.
Sugimoto et al., Performance of an OFDM Communication System under a Frequency and Time Dependent Power-Line Channel presented at ISPLC2001 on Apr. 4-6, 2001, downloaded from: http://isplc2003.katayama.nuee.nagoya-u.ac.jp/plc-symposia/Malmo-2001.html.

* cited by examiner

Example of Noise Variation with AC Line Cycle Phase

Network Configuration

Station Configuration

Example of Tone Map Regions for AC Line Cycle Approach

Example of Tone Map Regions for Half Line Cycle Approach

Example of Fixed Tone Map Regions with Five Regions per Half Cycle

Example of Stations with AC Phase Offset

Phase Offest Computation Using Transmiter Zero Crossing Time Stamps

Synchronizer Zero Crossing Tracking Circuit

MPDU Format

MPDU Boundaries matching tone map boundaries

MPDU Boundaries crossing tone map boundaries

CHANNEL ADAPTATION SYNCHRONIZED TO PERIODICALLY VARYING CHANNEL

TECHNICAL FIELD

This invention relates to high-speed communication using AC power lines.

BACKGROUND

Communication systems are designed to reliably transfer information using the underlying physical medium. Well-known communication systems like Ethernet use special wiring (e.g., Cat 5 cable) for exchanging information. Such systems, by design, allow all connected stations to exchange data at a fixed data rate. With the increasing need for ubiquitous exchange of information, a new class of no-new-wire systems has emerged. Such systems use existing infrastructure to exchange information. Power line communication systems are one example of such systems.

Power line communication systems use existing AC wiring to exchange information. Owing to their being designed for much lower frequency transmissions, AC wiring provides varying channel characteristics at the higher frequencies used for data transmission (e.g., depending on the wiring used and the actual layout). To maximize the data rate between various links, stations need to adjust their transmission parameters dynamically in both time and frequency. This process is called channel adaptation. Channel adaptation results in a set of transmission parameters (referred to as tone maps in this document) that can be used on each link. Tone maps include such parameters as the frequencies used, their modulation, and the forward error correction (FEC) used. In high-speed power line communication systems, good channel adaptation is critical to providing high data rates on all links.

SUMMARY

We have discovered that higher data rates can be achieved in power line communication systems by taking into account the fact that the noise and/or the frequency response of the power line channel between any pair of stations depends on the AC line cycle phase.

Power line communication systems share the power line medium with various appliances that draw electric power from the power supply grid. These devices are some of the major sources of noise that affect the characteristics of power line channels. Several types of such devices generate noise that varies with the AC line cycle phase and the carrier frequencies. FIG. 1 shows an example wherein the noise around the zero crossing on the AC line cycle is lower by comparison to the noise at the peaks of the AC cycle. Devices like triac-controlled dimmers turn on and off during each AC line cycle. These not only generate impulse noise but also change the channel frequency response. Further, several devices that use AC motors (e.g., vacuum cleaners, drills, etc.) generate noise that is also a function of the phase of the line cycle. The net effect is a time varying channel whose noise characteristics and frequency response depend on the AC line cycle phase.

In general the invention features a method of operating in a network in which a plurality of stations communicate over a shared medium having a periodically varying channel. The method includes determining a plurality of channel adaptations for communication between a pair of stations, and assigning a different one of the plurality of channel adaptations to each of a plurality of phase regions of the periodically varying channel.

In preferred implementations, one or more of the following features may be incorporated. The channel adaptations for a particular phase region may be adapted to the channel in that phase region. The network may be a power line communication network, the shared medium may be an AC power line (inside or outside a building and low, medium, or high voltage), and the channel characteristics may vary with the phase of the AC line cycle. Channel adaptation may be synchronized to the periodically varying channel. Channel adaptation may be substantially unique between any pair of transmitter and receiver. Each station may have a channel adaptation facility that interacts with the channel facility at other stations. The channel adaptation facility may include a tone map generator for generating a tone map. The channel adaptation facility may include an indication of the start of the AC line cycle. The stations may exchange tone maps. The tone map generator may have the capability to generate multiple tone maps, with different tone maps being assigned to different phases regions of the AC line cycle. Different tone maps may be assigned to different regions of each half cycle of the AC line cycle, with each half cycle of the AC line cycle being treated as equivalent to the other half cycle for the purpose of channel adaptation. The AC line cycle may be divided into a plurality of substantially equal size phase regions, to which a different tone map may be assigned. Some of the substantially equal size phase regions may be assigned the same tone map. Associated with each tone map may be an indication of the tolerance of that tone map for use outside its boundaries. The indication of the start of an AC line cycle may include recognition of an AC line cycle zero crossing. The indication of the start of an AC line cycle may include recognition of an AC line cycle zero crossing followed by a rising signal. The indication of the start of an AC line cycle may include recognition of an AC line cycle zero crossing followed by a falling signal. The indication of the start of an AC line cycle may include recognition of a repeating feature in the AC line signal. The repeating feature in the AC line signal may include one or more of the following: a zero crossing, a peak in AC power amplitude, a peak or a minimum in noise amplitude. Time stamps may be transmitted between stations to aid synchronization of channel adaptation to the AC line cycle. The phase of the AC line cycle at a receiving station may be offset from the AC line cycle at a transmitting station, and information relating to the phase offset may be provided to the transmitting station so that the channel adaptation used by the transmitting station is synchronized to the AC line cycle at the receiving station. The information relating to the phase offset may include a zero crossing offset between the receiving and transmitting stations. The receiving station may determine the zero crossing offset, and transmit it to the transmitting station. The transmitting station may determine the zero crossing offset. One station in the network may track the AC line cycle zero crossing and transmit information on the time of the zero crossing to a plurality of stations on the network, and the plurality of stations may use the time of the zero crossing at the one station as their own local AC line cycle zero crossing. The AC line cycle zero crossing may be derived using virtual tracking, wherein a station uses its local clock along with knowledge of the AC line cycle frequency to track a virtual zero crossing. The number of tone map regions, boundaries of each region, and the tone map for each region may be determined based on periodically varying channel attenuation characteristics or on periodically varying local noise characteristics. If data is transmitted in packets that include at least one header and one payload, the tone map boundaries and length of the packets may be configured so that the payload of most packets is transmitted within one phase region so that a payload does not cross a boundary between tone maps. Or the tone map boundaries and length of the packets may be configured so that the payload of at least some packets is transmitted in two adjoining phase regions, so that a first portion of the payload is transmitted using one tone map and a second portion of the payload is transmitted using a second tone map.

Among the many advantages of the invention (some of which may be achieved only in some of its implementations) are the following. It enables stations to operate reliability and at higher data rates under various power line environments. It provides a channel adaptation mechanism that can be used in power line communication systems as well as other media that are affected by periodically varying channel impairments. It can provide a higher level of guaranteed quality of service (QoS).

DETAILED DESCRIPTION

There are a great many possible implementations of the invention, too many to describe herein. Some possible implementations that are presently preferred are described below. It cannot be emphasized too strongly, however, that these are descriptions of implementations of the invention, and not descriptions of the invention, which is not limited to the detailed implementations described in this section but is described in broader terms in the claims.

Figure 1:
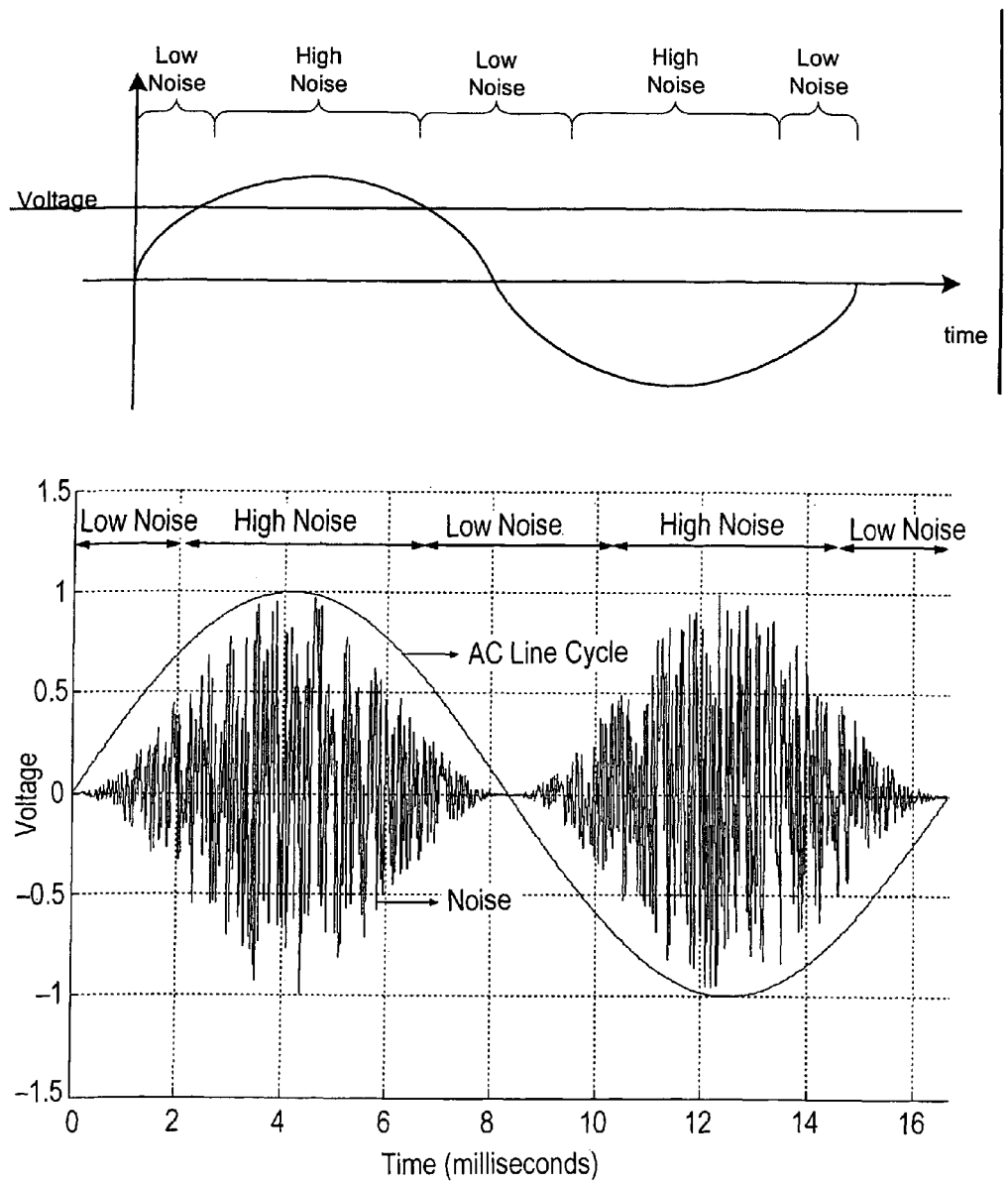
FIG. 1 shows an example of the variation in noise with AC line cycle phase.
Figure 2:
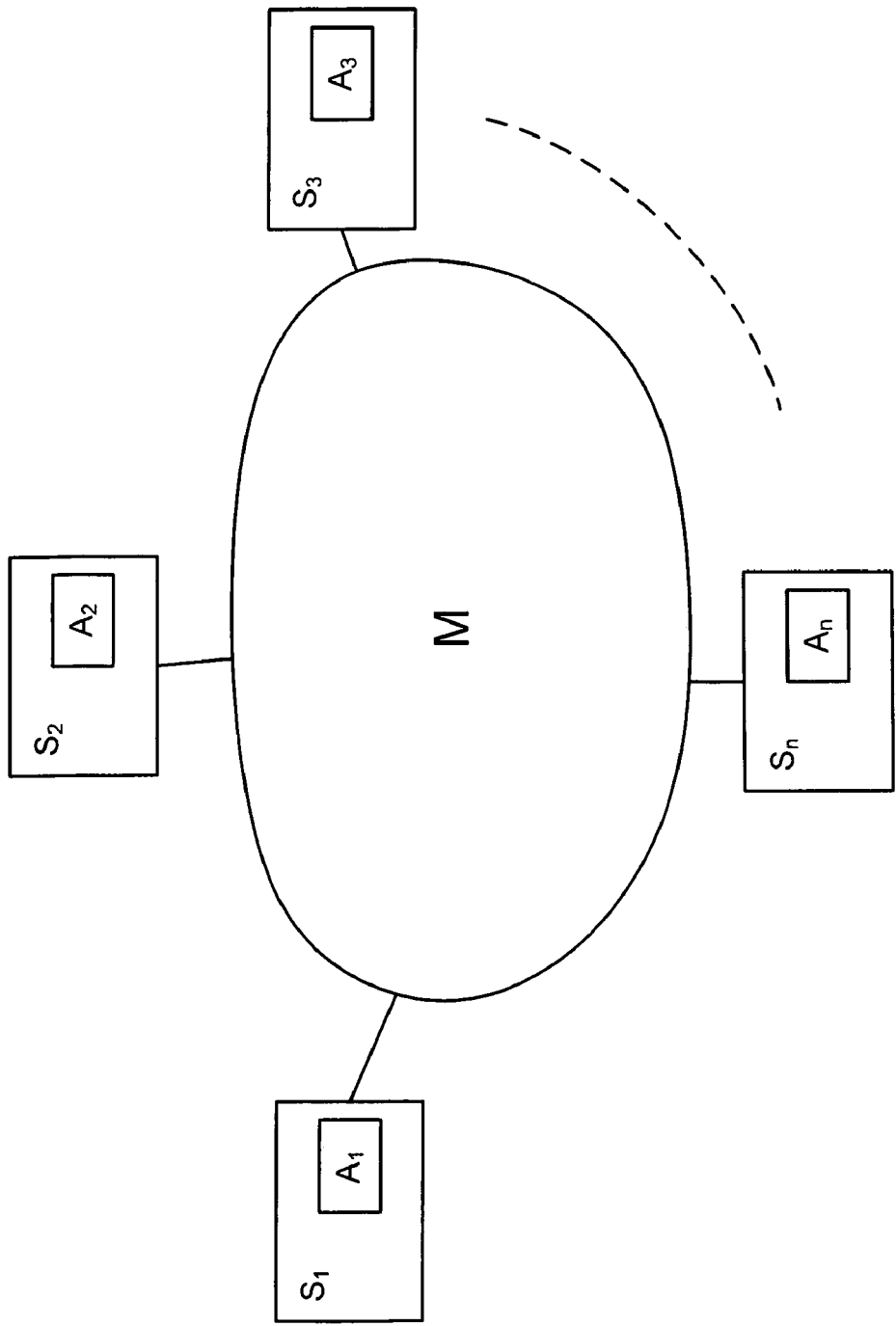
FIG. 2 is a schematic of a power line network configuration.

As shown in FIG. 2, the network configuration may include a plurality of stations, $S_1$ to $S_n$, communicating over power line medium M. Because of the previously discussed channel variations between different locations on a power line network, medium M is unique between any pair of stations. Furthermore, the medium characteristics (which include attenuation, noise etc.,) show a periodic behavior. Each station $S_i$ has a channel adaptation function $A_i$, that interacts with channel adaptation function at other stations to determine communication parameters that are referred to as tone maps.

Figure 3:
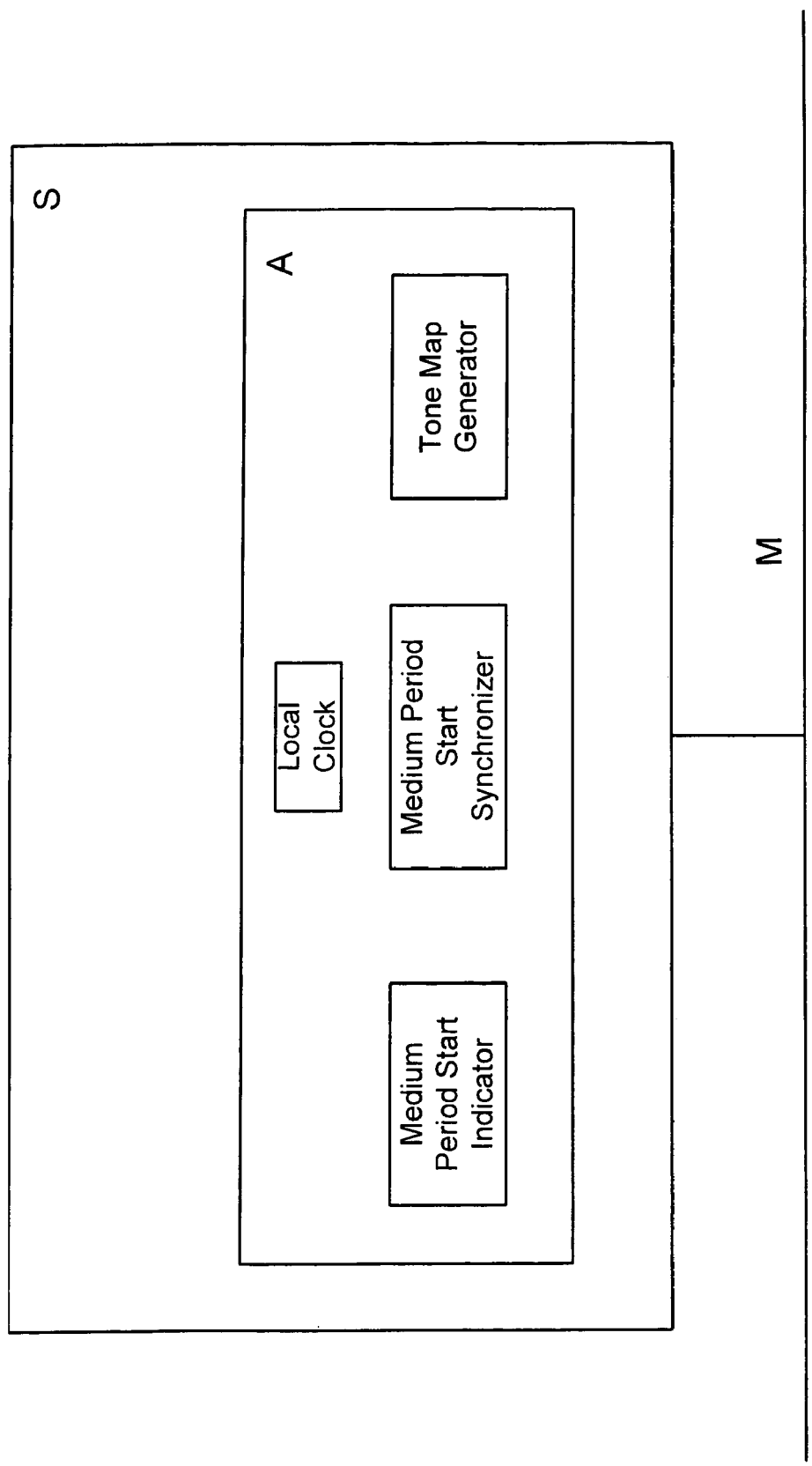
FIG. 3 is a block diagram of the configuration of a station on the power line network.

FIG. 3 shows a typical station configuration. Each station S includes a channel adaptation function A, which includes a local clock, tone map generator, medium period start indicator (MPSI) and medium period start synchronization (MPSS). The tone map generator provides the tone maps that are used at various phase regions of the AC cycle. Each tone map specifies parameters including the set of carriers that are to be used, their modulation, and the forward error correction coding to be used. The local clock is a free running clock operating at a certain frequency. It is used as a time reference at each station. The medium period start indicator (MPSI) provides a reference for the start of the medium period for channel adaptation purposes. The medium period start synchronizer (MPSS) is used in implementations in which the MPSI of the transmitter and the MPSI of the receiver are offset from each other. The MPSS enables the tone map boundaries to be properly interpreted by the transmitter and the receiver.

Figure 4:
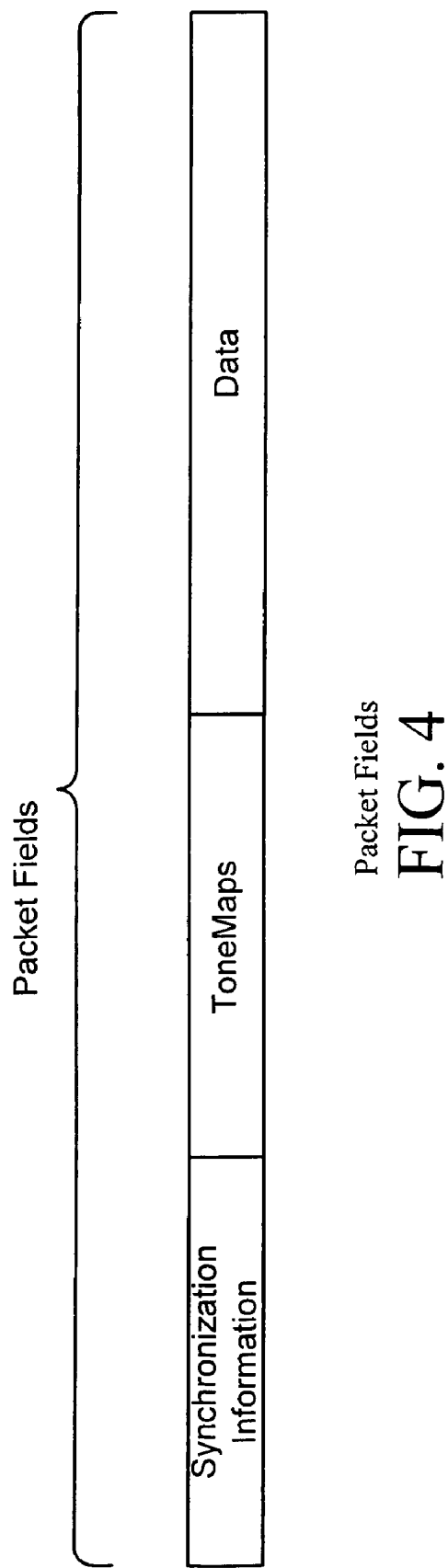
FIG. 4 shows the format of a packet sent over the network.

Stations exchange structured protocol entities called packets, the format of which is shown in FIG. 4. The packet format allows for the exchange of tone maps, various fields required for medium period start synchronization (which can vary with the particular implementation), and regular data.

Various implementations of the tone map generator are possible. In general terms, the tone map generator uses knowledge of channel characteristics and the variation of those characteristics with the phase of the AC line cycle to derive multiple tone maps, which are assigned to different phase regions. The tone map generator uses the channel characteristics and their variation of those characteristics with the phase of the AC line cycle to determine the number of tone maps regions and the boundaries for each tone map region. Tone Map generator also generates tone maps for each of the tone map regions. The channel characteristics used by the tone map generator can include channel attenuation characteristics (or equivalently, the channel impulse response). The channel characteristics used by the tone map generator can also include local noise characteristics.

Figure 5:
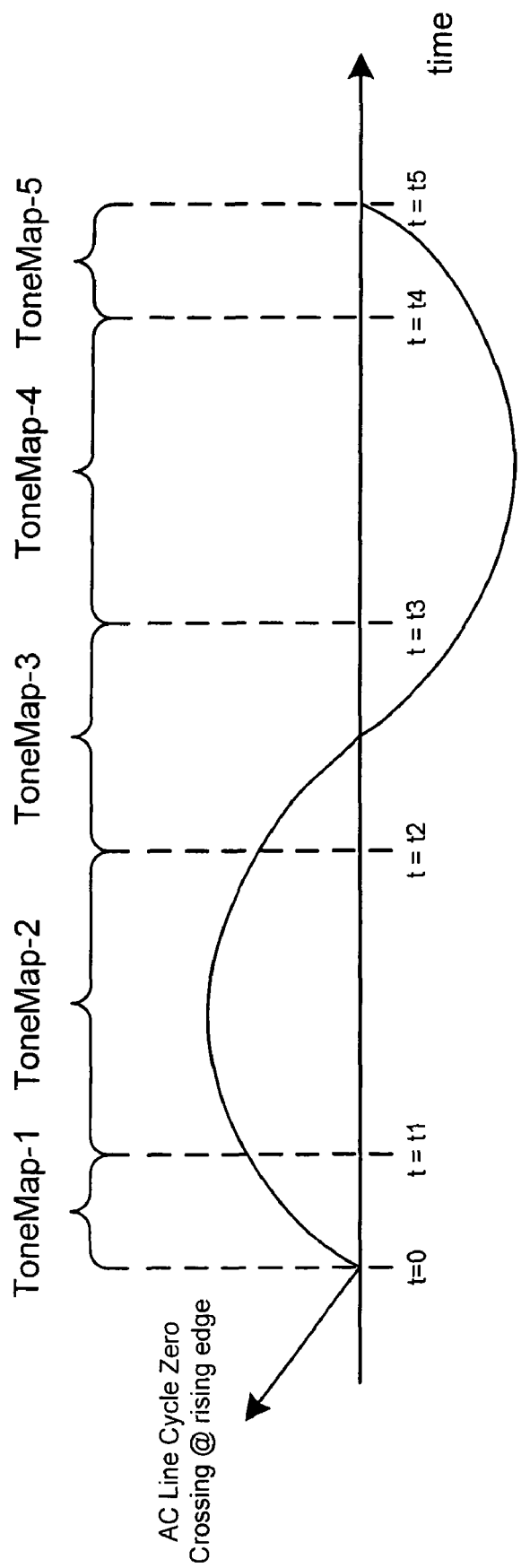
FIG. 5 shows an implementation in which a different tone maps may be assigned to each of five different phase regions of the AC line cycle.

In one implementation, the receiver generates multiple tone maps that can be used in various phase regions of each AC line cycle. FIG. 5 shows an example of such an implementation. In this example, the medium period start indicator (MPSI) tracks the rising edge of the AC zero crossing, and the channel estimation process produces five tone maps, one for each of five phase regions of the AC line cycle. ToneMap-1 is valid in regions (0, t1). ToneMap-2 is valid in regions (t1, t2). ToneMap-3 is valid in regions (t2, t3). ToneMap-4 is valid in region (t3, t4). ToneMap-5 is valid in region (t4, t5). The number of tone maps and their boundaries can be varied enormously from what is shown in FIG. 5.

Figure 6:
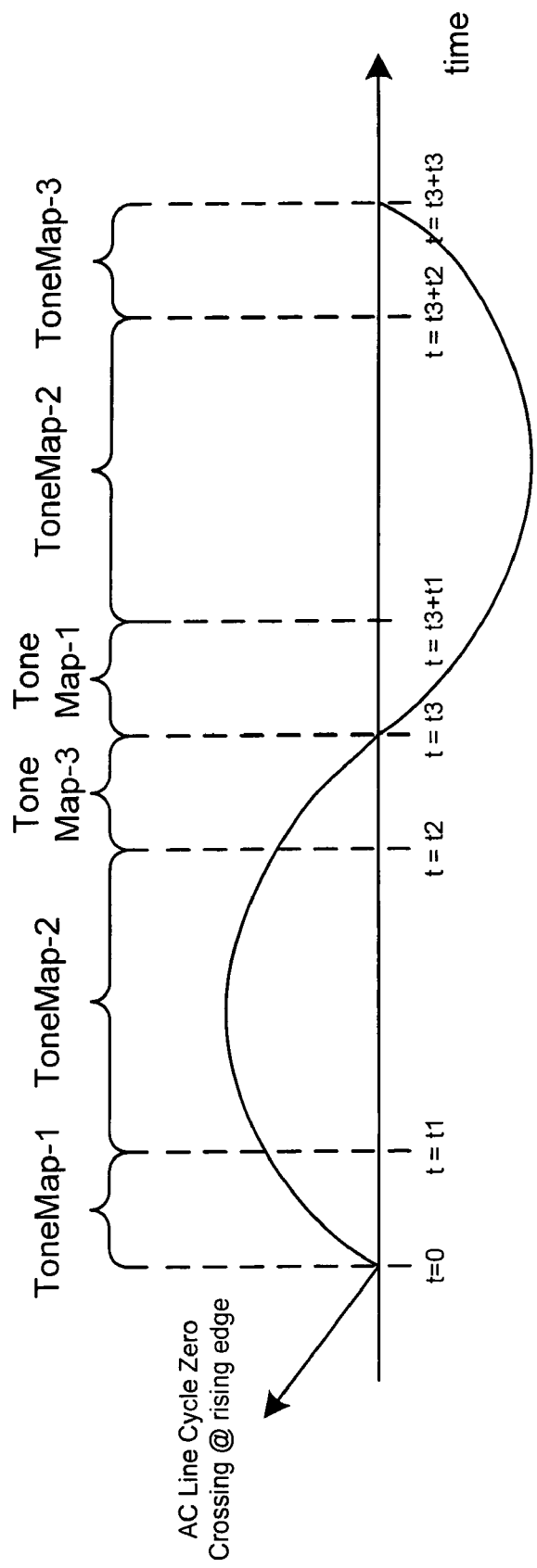
FIG. 6 shows an implementation in which a different tone map may be assigned to each of three different phase regions of each half period of the AC line cycle.

Another implementation allows the receiver to generate multiple tone maps that can be used in various phase regions of each AC half line cycle. But in this implementation; both the positive and negative halves of the AC line cycle are treated as equivalent. The two halves of the line cycle are very often substantially identical (except for being of opposite phase) in most PLC networks. FIG. 6 shows an example of the tone maps used in this implementation. The MPSI tracks the zero crossing of the AC line cycle, and the channel estimation process produces three tone maps. ToneMap-1 is valid in regions (0, t1) and (t3, t3+t1). ToneMap-2 is valid in regions (t1, t2) and (t3+t1, t3+t2). ToneMap-3 is valid in regions (t2, t3) and (t3+t2, t3+t3). As with the first implementation example, the number of tone maps and their boundaries can be varied enormously from what is shown in FIG. 6.

Figure 7:
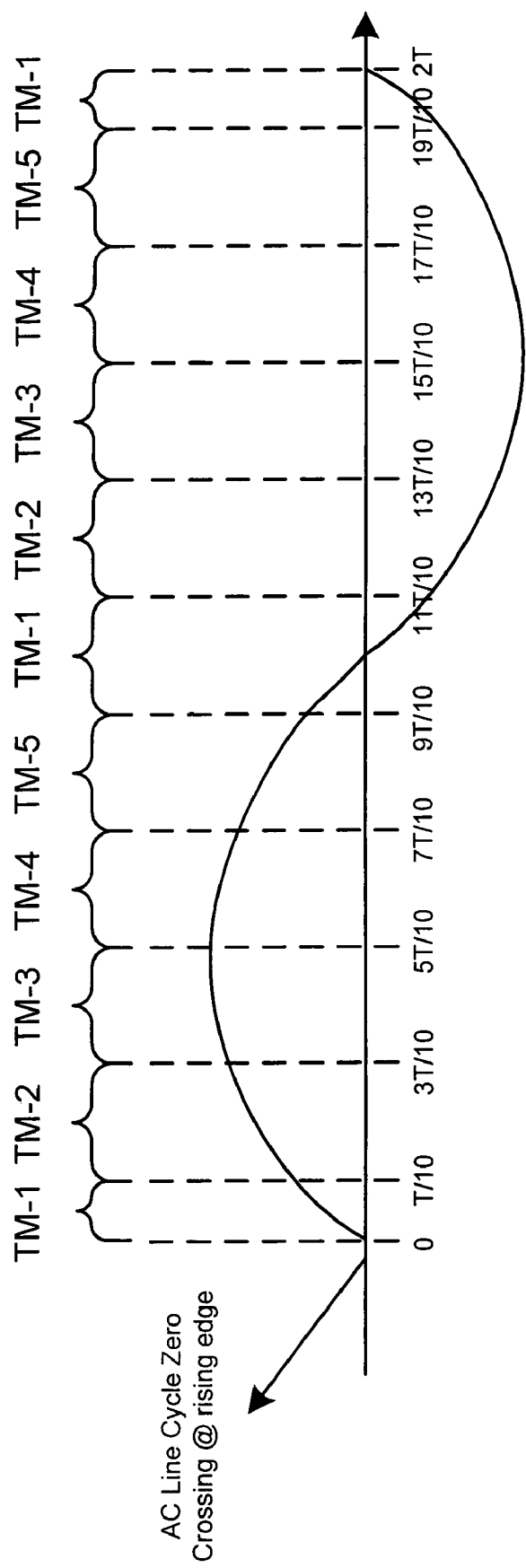
FIG. 7 shows an implementation in which a different tone map may be assigned to each of five equal-size phase regions of each half period of the AC line cycle.

Another implementation divides the AC line cycle into a fixed number of equal size phase regions. The channel adaptation process in this case results in tone maps for each of the equal size regions. It may turn out, that the same tone map is used in more than one of the regions. This approach can also use either full line cycle (e.g., FIG. 5) or half line cycle (e.g., FIG. 6) repetition of tone maps. FIG. 7 shows an example where each half line cycle is divided into five phase regions, and the channel adaptation process produces tone maps for each of the five regions. Depending on the channel conditions, it is possible that the same tone map is used in multiple regions. For example, ToneMap-1 and ToneMap-2 might be the same. In this example, the MPSI tracks the zero crossings of the AC line cycle.

Figure 11:
FIG. 11 shows the MPDU format.

In all the above implementations, the tone maps generated may contain a tolerance for their boundaries. For example, a tone map may have a 100 μsec tolerance, which indicates that the tone map may be used up to a maximum of 100 μsec away from the actual boundary. Alternatively, a tone map may have a zero tolerance, indicating that the tone map may not be used beyond the boundaries provided. Another approach is to have tone maps boundaries overlap to indicate the tolerance. The transmitting station should ensure that proper tone maps are used at various phases of the AC line cycle. Several approaches can be used by the transmitter to maintain tone map boundaries. Some implementations that are considered preferred are presented below. These implementations can be used in packet-oriented networks, where MAC Protocol Data Units (MPDUs) are used to exchange data between stations. FIG. 11 shows the MPDU format. MPDU contains header and payload fields. The header field contains information on MPDU transmission duration and tone map used for transmitting the payload fields. The payload field contains the data that is being exchanged.

Figure 12:
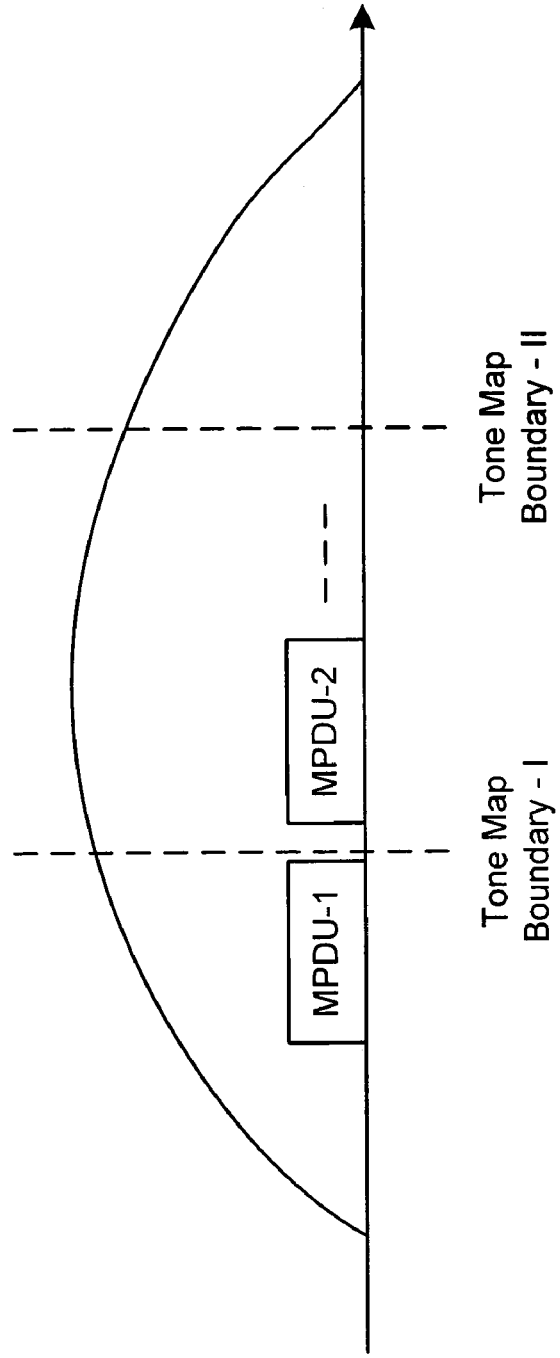
FIG. 12 shows an example where MPDU boundaries matching tone map boundaries.
Figure 13:
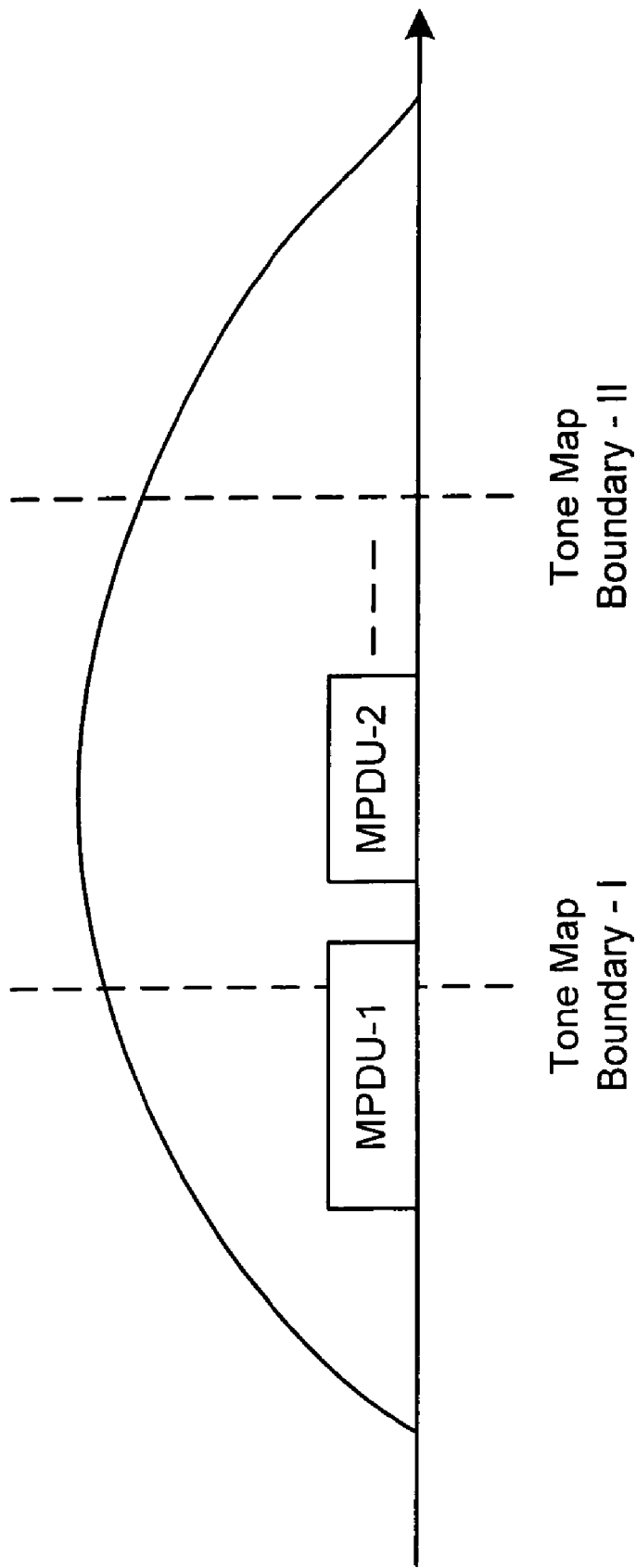
FIG. 13 shows an example where MPDU boundaries cross tone map boundaries.

One preferred implementation is to align the MPDU payload boundaries so that they do not cross tone map boundaries. FIG. 12 shows an example with two tone map boundaries within a AC half line cycle. In this case, the length of MPDU-1 is chosen so that the payload duration does not cross the tone map boundary-I. A similar procedure has to be used at the tone map boundary-II. Another approach is to allow for change of tone map within the MPDU payload. FIG. 13 shows an example of this preferred implementation. In this case, the MPDU header will indicate the location within the MPDU payload where a tone map change occurs. Thus, the MPDUs payload duration need not be aligned to the tone map boundaries.

Figure 8:
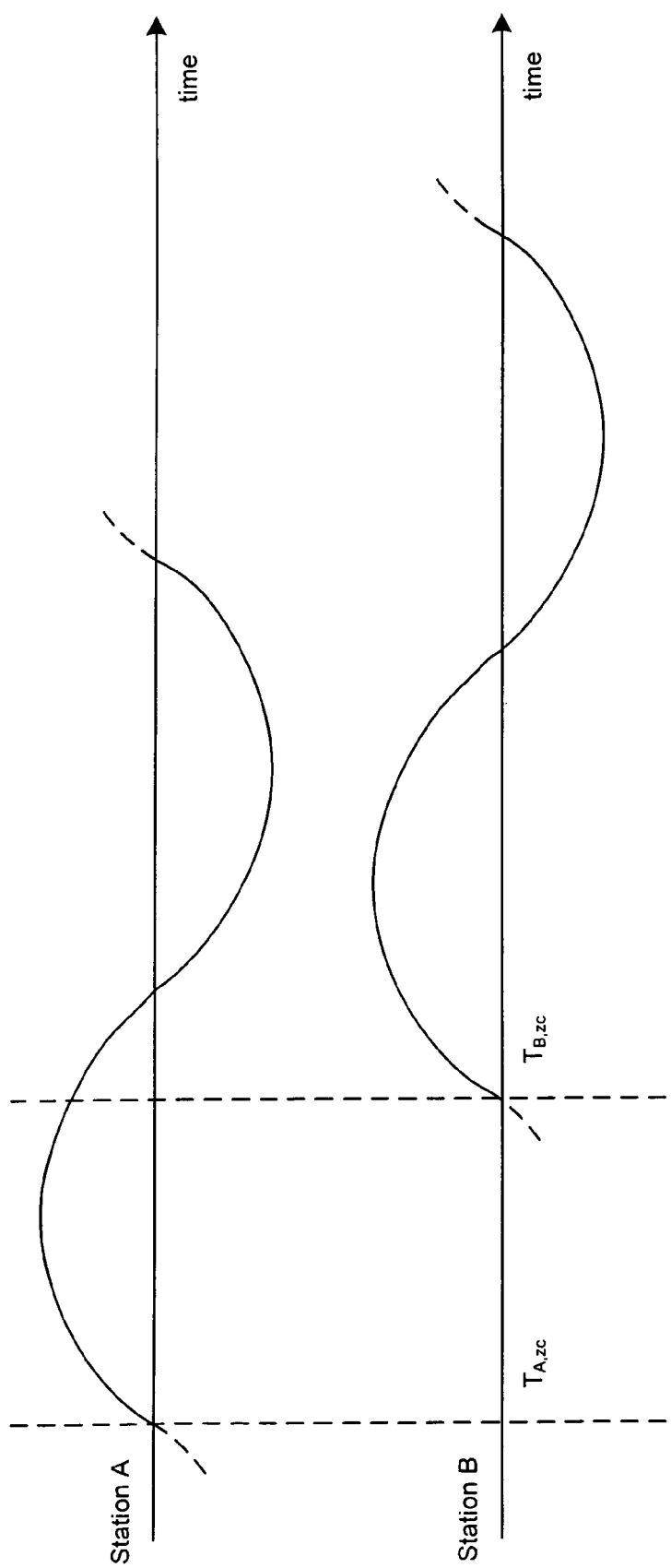
FIG. 8 shows an example in which the phase of the AC line cycle is offset between the transmitting and receiving stations.

As shown in FIG. 8, the AC line phase experienced by the transmitter (Station A) may be offset from the phase experienced by the receiver (Station B). This can result from various causes, including the two stations being on different phases of the AC power in the building, or inductive loading from an AC motor. Generally, it is desirable that the tone maps used be prescribed by the phase of the receiver. For that to happen, the transmitter must be made aware of the relative phase offset of the receiver from the transmitter. A wide variety of implementations are possible for achieving this result.

Figure 9:
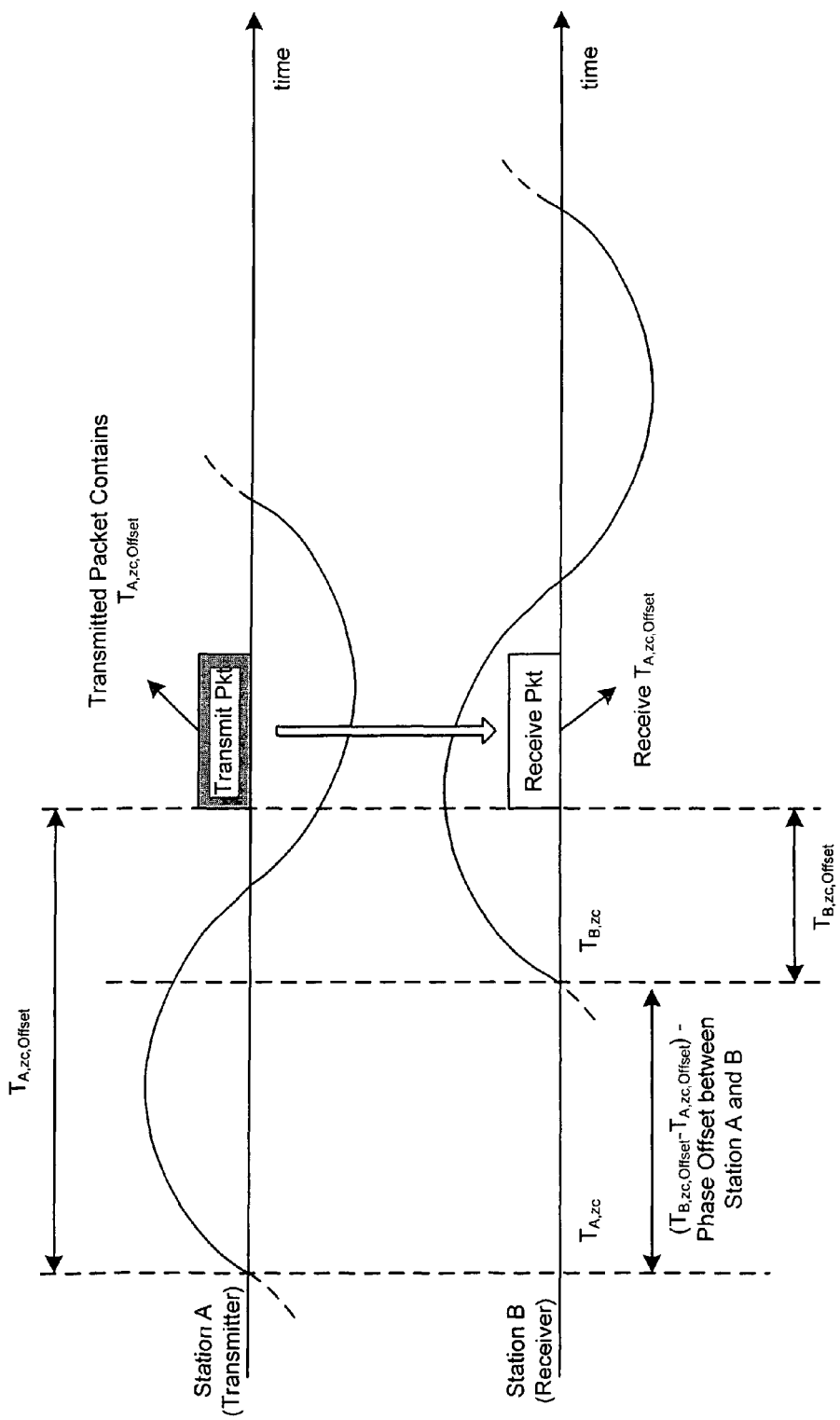
FIG. 9 illustrates the use of transmitter zero cross time stamps to compute the phase offset between stations.

One implementation uses knowledge of the AC zero crossing at each station. A circuit at both the transmitter and receiver, tracks the rising edge of the AC line cycle zero crossing, and information characterizing the offset of the zero crossings is transmitted to the other station. For example, the transmitter (Station A in FIG. 9) may insert the offset of the current time from AC zero crossing ($T_{A,zc,Offset}$) just before transmitting a packet, The receiver may then store its local AC zero crossing offset ($T_{B,zc,Offset}$) upon reception of the packet. The difference between the local and received zero crossing offsets ($T_{B,zc,Offset} - T_{A,zc,Offset}$) provides the relative phase offset of the receiver from the transmitter. Information relating to the phase offset can be sent back to the transmitter in another packet so that tone maps used by the transmitter can be synchronized to the zero crossing at the receiver. Alternatively, the transmitter could determine the offset, by itself, based on zero crossing offset information received from the receiver.

Figure 10:
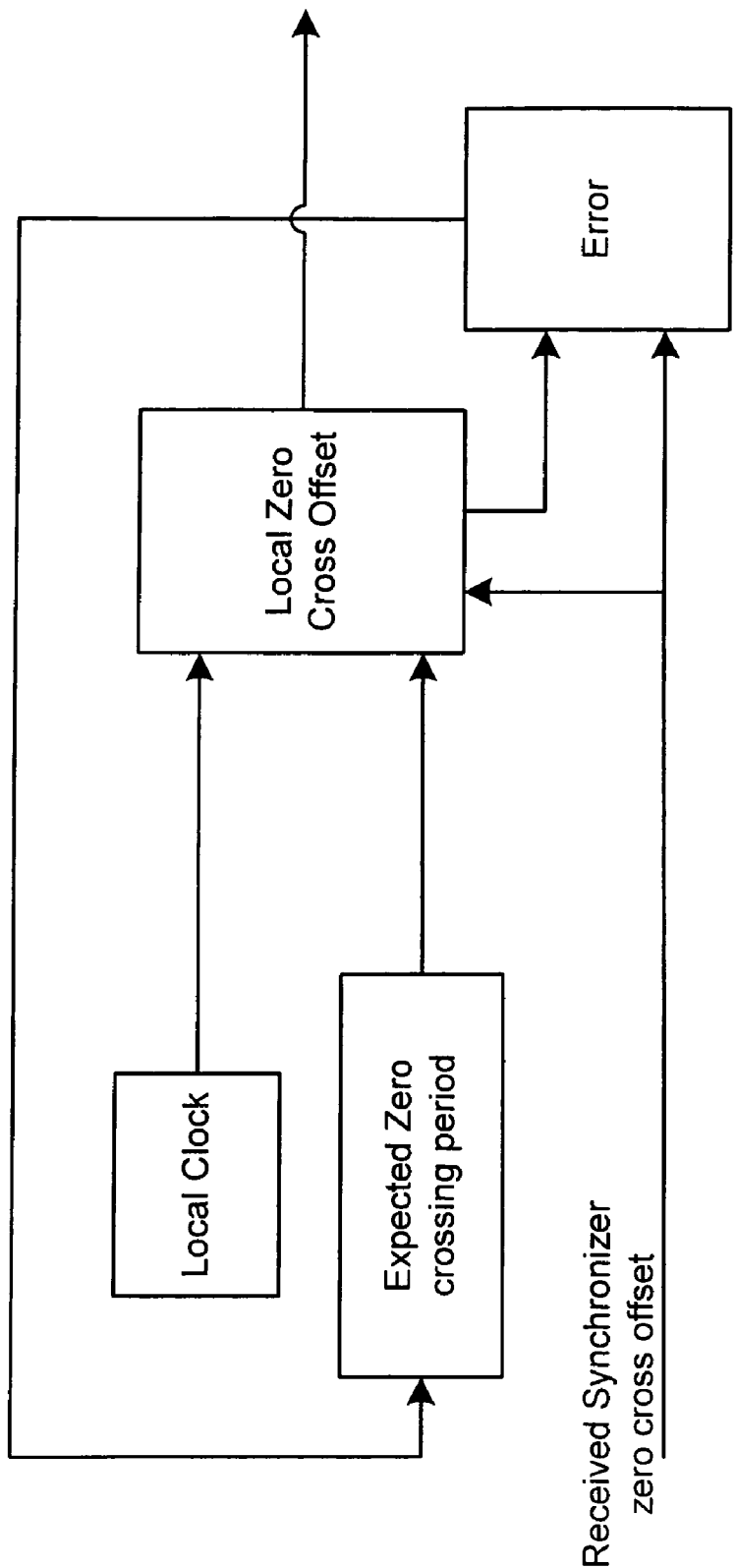
FIG. 10 is a block diagram of a synchronizer zero crossing tracking circuit that can be used in some implementations.

Another implementation uses a centralized approach, wherein one station (referred to as the synchronizer station) in the network has a circuit for tracking the rising edge of the AC line cycle zero crossing. The packet format for this implementation enables the transmission of the zero crossing offset between the synchronizer station and all other stations in the network (e.g., by broadcast to all stations in the network and/or unicast to each individual station). All stations in the network track the AC line cycle zero crossing of the synchronizer station and use it as their own local AC line cycle zero crossing. FIG. 10 shows an example of a circuit that can be used to track the synchronizer station zero crossing. This circuit computes the expected zero crossing period based on a feedback loop. Tone map boundaries of all stations in the network are synchronized as all stations track the same synchronizer station zero crossing.

Various alternatives to tracking the rising edge of the AC line cycle zero crossing are possible. For example, a circuit tracking the falling edge of the AC Line cycle zero crossing can be used. Alternatively, a circuit tracking the zero crossing (irrespective of whether it is the rising or falling edge) of the AC line cycle can be used. And a circuit tracking a certain phase (for example, a peak of one polarity of the other) can be tracked in place of zero crossings. Another of the many possibilities is a circuit that tracks the synchronous noise on the line cycle.

The physical tracking of the zero crossing can also be replaced by virtual tracking. To use virtual tracking, a station uses its local clock along with knowledge of the AC line cycle frequency to track a virtual zero crossing. If the local clocks are not tightly synchronized, stations may exchange time stamps to obtain tight synchronization.

Time stamps of various types can be sent while channel adaptation is in progress or during regular transmissions.

Many other implementations of the invention other than those described above are within the invention, which is defined by the following claims.

What is claimed is:

1. A method of operating in a network in which a plurality of stations communicate over a shared medium carrying a periodically varying signal, comprising:

for each of one or more pairs of transmitter and receiver stations, determining a plurality of channel adaptations for communication between the pair of stations;

assigning a different one of the plurality of channel adaptations to each of a plurality of phase regions of the periodically varying signal; and synchronizing the plurality of channel adaptations to the periodically varying signal based on phase offset information received from a station other than the pair of stations, the station other than the pair of stations including a circuit for tracking a predetermined characteristic of the periodically varying signal and generating the phase offset information based on the predetermined characteristic, wherein the channel adaptations include one or more communication parameters adjusted for the communication between the pair of stations, and wherein each of the pair of stations includes a channel adaptation facility for determining the one or more communication parameters.

2. The method of claim 1 wherein the channel adaptations for a particular phase region of the periodically varying signal are adapted to a channel between the pair of stations through the medium carrying the periodically varying signal in that phase region of the periodically varying signal.

3. The method of claim 2 wherein the network is a power line communication network, the shared medium is an AC power line, the periodically varying signal is an AC line cycle, and one or more channel characteristics vary with a phase of the AC line cycle.

4. A method of operating in a network in which a plurality of stations communicate over a shared medium carrying a periodically varying signal, comprising:

for each of one or more pairs of transmitter and receiver stations, synchronizing channel adaptation for communication between the pair of stations to the periodically varying signal based on phase offset information received from a station other than the pair of stations, the station other than the pair of stations including a circuit for tracking a predetermined characteristic of the periodically varying signal and generating the phase offset information based on the predetermined characteristic, wherein the channel adaptation includes one or more communication parameters adjusted for the communication between the pair of stations, and wherein each of the pair of stations includes a channel adaptation facility for determining the one or more communication parameters.

5. The method of claim 4 wherein the network is a power line communication network, the shared medium is an AC power line, the periodically varying signal is an AC line cycle, and one or more channel characteristics vary with a phase of the AC line cycle.

6. A method of operating in a power line communication network in which a plurality of stations communicate over an AC power line carrying an AC line cycle in which one or more channel characteristics vary with a phase of the AC line cycle, comprising:

for each of one or more pairs of transmitter and receiver stations, synchronizing channel adaptation for communication between the pair of stations to the phase of the AC line cycle based on phase offset information received from a station other than the pair of stations, the station other than the pair of stations including a circuit for tracking a predetermined characteristic of the AC line cycle and generating the phase offset information based on the predetermined characteristic, wherein the channel adaptations include one or more communication parameters adjusted for the communication between the pair of stations, and wherein each of the pair of stations includes a channel adaptation facility for determining the one or more communication parameters.

7. The method of claim 1, 4 or 6 where channel adaptation is unique between any of the one or more pairs of transmitter and receiver stations.

8. The method of claim 6 wherein the channel adaptation facility interacts with channel adaptation facilities at other stations.

9. The method of claims 1 or 4 wherein the channel adaptation facility interacts with channel adaptation facilities at other stations.

10. The method of claim 8 wherein the channel adaptation facility comprises a tone map generator for generating a tone map.

11. The method of claim 9 wherein the channel adaptation facility comprises a tone map generator for generating a tone map.

12. The method of claim 10 wherein the channel adaptation facility comprises an indication of the start of the AC line cycle.

13. The method of claim 10 wherein the stations exchange tone maps.

14. The method of claim 10 wherein the tone map generator has the capability to generate multiple tone maps, with different tone maps being assigned to different phases regions of the AC line cycle.

15. The method of claim 14 wherein different tone maps are assigned to different regions of each half cycle of the AC line cycle, with each half cycle of the AC line cycle being treated as equivalent to the other half cycle for the purpose of channel adaptation.

16. The method of claim 14 wherein the AC line cycle is divided into a plurality of phase regions, to which a different tone map may be assigned.

17. The method of claim 16 wherein some of the phase regions are assigned the same tone map.

18. The method of claim 15 wherein the AC line cycle is divided into a plurality of phase regions, to which a different tone map may be assigned.

19. The method of claim 18 wherein some of the phase regions are assigned the same tone map.

20. The method of claim 10 wherein associated with each tone map is an indication of the tolerance of that tone map for use outside its boundaries.

21. The method of claim 11 wherein associated with each tone map is an indication of the tolerance of that tone map for use outside its boundaries.

22. The method of claim 12 wherein the indication of the start of an AC line cycle comprises recognition of an AC line cycle zero crossing.

23. The method of claim 12 wherein the indication of the start of an AC line cycle comprises recognition of an AC line cycle zero crossing followed by a rising signal.

24. The method of claim 12 wherein the indication of the start of an AC line cycle comprises recognition of an AC line cycle zero crossing followed by a falling signal.

25. The method of claim 12 wherein the indication of the start of an AC line cycle comprises recognition of a repeating feature in the AC line signal.

26. The method of claim 25 wherein the repeating feature in the AC line signal comprises one or more of the following: a zero crossing, a peak in AC power amplitude, a peak or a minimum in noise amplitude.

27. The method of claim 6 wherein time stamps are transmitted between stations to aid synchronization of channel adaptation to the AC line cycle.

28. The method of claim 4 wherein time stamps are transmitted between stations to aid synchronization of channel adaptation.

29. The method of claim 6 wherein the phase of the AC line cycle at the receiver station is offset from the phase of the AC line cycle at the transmitter station, and the phase offset information is provided to the transmitter station so that the channel adaptation used by the transmitter station is synchronized to the AC line cycle at the receiver station.

30. The method of claim 29 wherein the phase offset information is related to a zero crossing of the AC line cycle at the station other than the pair of stations.

31. The method of claim 30 wherein the receiver station determines a zero crossing offset corresponding to the zero crossing of the AC line cycle at the station other than the pair of stations based on the phase offset information.

32. The method of claim 31 wherein the transmitter station determines a zero crossing offset corresponding to the zero crossing of the AC line cycle at the station other than the pair of stations based on the phase offset information.

33. The method of claim 22 wherein the station other than the pair of stations tracks the AC line cycle zero crossing and transmits information on the time of the zero crossing to the rest of the plurality of stations on the network, and wherein the plurality of stations use the time of the zero crossing at the station other than the pair of stations as their own local AC line cycle zero crossing.

34. The method of claim 22 wherein the AC line cycle zero crossing is derived using virtual tracking, wherein a station uses its local clock along with knowledge of the AC line cycle frequency to track a virtual zero crossing.

35. The method of claim 14 wherein the number of tone map regions, boundaries of each region, and the tone map for each region are determined based on periodically varying channel attenuation characteristics.

36. The method of claim 14 wherein the number of tone map regions, boundaries of each region, and the tone map for each region are determined based on periodically varying local noise characteristics.

37. The method of claim 14 wherein data is transmitted in packets that include at least one header and one payload, and wherein the tone map boundaries and length of the packets are configured so that the payload of most packets is transmitted within one phase region so that the payload does not cross a boundary between tone maps.

38. The method of claim 14 wherein data is transmitted in packets that include at least one header and one payload, and wherein the tone map boundaries and length of the packets are configured so that the payload of at least some packets is transmitted in two adjoining phase regions, so that a first portion of the payload is transmitted using one tone map and a second portion of the payload is transmitted using a second tone map.

39. A method of operating in a network in which a plurality of stations communicate over a shared medium carrying a periodically varying signal, comprising:
for each of pairs of transmitter and receiver stations,
determining a plurality of channel adaptations for adapting to a link between the pair of stations, each of the plurality of channel adaptations specifying communication parameters that are unique to the pair of stations, where the communication parameters include a plurality of frequencies used for communicating over the link between the pair of stations and include respective modulations for the specified frequencies;
assigning a different one of the plurality of channel adaptations to each of a plurality of phase regions of the periodically varying signal; and
synchronizing the plurality of channel adaptations to the periodically varying signal based on phase offset information received from a station other than the pair of stations, the station other than the pair of stations including a circuit for tracking a predetermined characteristic of the periodically varying signal and generating the phase offset information based on the predetermined characteristic,
wherein each of the pair of stations includes a channel adaptation facility for determining the communication parameters.

40. The method of claim 1 wherein the phase offset information includes zero crossing offset information of the station other than the pair of stations.

41. The method of claim 40 wherein the station other than the pair of stations transmits the zero crossing offset information to the rest of the plurality of stations including the one or more pairs of transmitter and receiver stations.

42. The method of claim 40 further comprising, at each of the one or more pairs of transmitter and receiver stations, tracking a zero crossing of the periodically varying signal at the station other than the pair stations using the zero crossing offset information.

43. The method of claim 42 wherein synchronizing the plurality of channel adaptations to the periodically varying signal is based on tracking the zero crossing of the periodically varying signal at the station other than the pair of stations.

44. The method of claim 42 wherein the station other than the pair of stations communicates with at least one of the pairs of transmitter and receiver stations using its own periodically varying signal zero crossing to synchronize a plurality of channel adaptations to the periodically varying signal.

45. The method of claim 1 wherein the predetermined characteristic includes a rising or falling edge of the periodically varying signal.

46. The method of claim 45 wherein the rising or falling edge of the periodically varying signal is tracked with respect to a zero crossing point of the periodically varying signal.

47. The method of claim 4 wherein the predetermined characteristic includes a rising or falling edge of the periodically varying signal.

48. The method of claim 6 wherein the rising or falling edge of the periodically varying signal is tracked with respect to a zero crossing point of the periodically varying signal.

49. The method of claim 6 wherein the predetermined characteristic includes a rising or falling edge of the AC line cycle.

50. The method of claim 49 wherein the rising or falling edge of the AC line cycle is tracked with respect to a zero crossing point of the AC line cycle.

51. The method of claim 39 wherein the predetermined characteristic includes a rising or falling edge of the periodically varying signal.

52. The method of claim 51 wherein the rising or falling edge of the periodically varying signals tracked with respect to a zero crossing point of the periodically varying signal.

* * * * *

UNITED STATES PATENT AND TRADEMARK OFFICE
CERTIFICATE OF CORRECTION

PATENT NO. : 7,715,425 B2
APPLICATION NO. : 10/787544
DATED : May 11, 2010
INVENTOR(S) : Lawrence W. Yonge, III It is certified that error appears in the above-identified patent and that said Letters Patent is hereby corrected as shown below:

On the Title Page Item (56) (Other Publications), Line 1, delete "Coomunications" and insert -- Communications --

Column 10, Line 41 (Approx.), In Claim 48, delete "claim 6" and insert -- claim 47 --

Column 10, Line 55, In Claim 52, delete "signals tracked" and insert -- signal is tracked --

Signed and Sealed this

Seventeenth Day of August, 2010

David J. Kappos
*Director of the United States Patent and Trademark Office*